(No Model.)
2 Sheets—Sheet 1.

R. M. HOWLING.
SPARK ARRESTER.

No. 281,766. Patented July 24, 1883.

WITNESSES.
INVENTOR.

(No Model.) 2 Sheets—Sheet 2.

R. M. HOWLING.
SPARK ARRESTER.

No. 281,766. Patented July 24, 1883.

WITNESSES.
J. C. Turner
Aug. Jordan

INVENTOR.
R. M. Howling
By his atty

UNITED STATES PATENT OFFICE.

RICHARD M. HOWLING, OF BALLARAT, VICTORIA.

SPARK-ARRESTER.

SPECIFICATION forming part of Letters Patent No. 281,766, dated July 24, 1883.

Application filed February 3, 1883. (No model.) Patented in Victoria October 4, 1882, No. 3,316, and in New South Wales December 5, 1882.

*To all whom it may concern:*

Be it known that I, RICHARD MATHEW HOWLING, a subject of the Queen of Great Britain, residing at Ballarat, in the British Colony of Victoria, engineer, have invented new and useful Improvements in Spark-Arresters, of which the following is a specification.

This invention has been designed for the purpose of producing an efficient apparatus for arresting sparks from funnels, flues, and chimneys of every description without weakening the draft therein.

It consists of a cage to fit on the top of such funnel, flue, or chimney, the top and upper part of the sides of which cage are of wire-gauze, while the bottom and lower part of its sides are of sheet or cast iron. Inside this cage, and some distance above the top of the funnel, I provide three concentric cylinders, between each of which there is an annular space, and between the outer one of which and the sides of the cage there is a still larger annular space. The outer of these three concentric cylinders has a cast-iron cap or hood, with some few small perforations in it—say four to the inch—and all three are supported on vertical studs springing from the bottom of the cage. The two inner cylinders are flanged outwardly at the bottom, for the double purpose of providing a means for connecting them to their supporting-studs, and also for directing the draft, which proceeds down them into the space between the sides of the cage and the outer of these cylinders. The upper part of these two inner cylinders I perforate, so as to assist in the downward draft in the annular spaces between them, and the middle one of the three is flanged inwardly at the top sufficiently to cover the space between it and the innermost cylinder.

In order, however, that my invention may be more clearly understood, I will now refer to the drawings hereto attached, in which—

Figure 1:
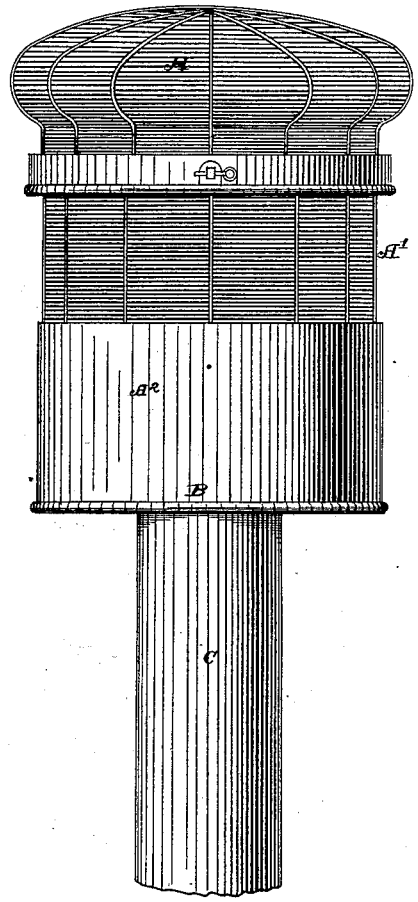
Figure 2:
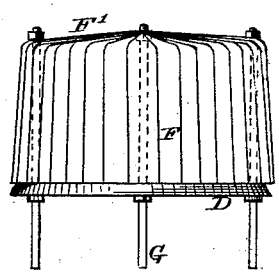
Figure 3:
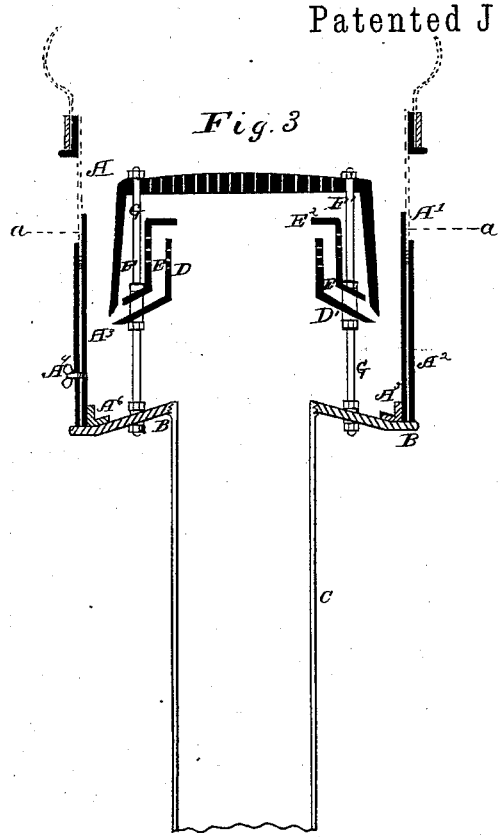
Figure 4:
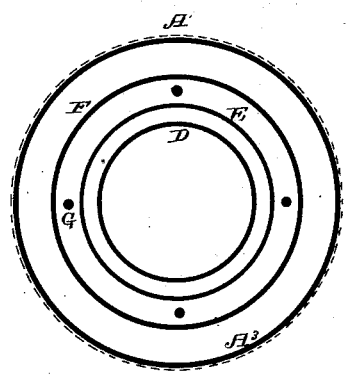

Figure 1 shows an elevation of an apparatus embodying my improvements; Fig. 2, an elevation of the internal fittings thereof; Fig. 3, a vertical section of the whole, and Fig. 4 a horizontal section on line $a\,a$ in Fig. 3.

A is the top of the cage, made of wire-gauze. A' is the upper part of its sides, and is also made of wire-gauze.

$A^2$ is the lower part of its sides, which are made of sheet-iron, and $A^3$ (to which it is attached by thumb-screws $A^4$) is a cylindrical casting, screwed on at $A^5$ to angle-iron $A^6$, bolted to the bottom of the cage, B, which is also not perforated, but is either screwed on or otherwise fastened to the flue C.

D, E, and F are the three cylinders to which I have referred, all supported on studs G, as shown.

D' and E' are the outward flanges at the bottom of the two inner cylinders, D and E, respectively.

$E^2$ is the inward flange on top of cylinder E, and F' is the perforated cap or hood to the outer cylinder, F.

In practice the draft proceeds upward through the innermost cylinder, impinges against the cap or hood F', and, with the exception of that small portion which passes through the perforations therein, is deflected and carried down one or other of the annular spaces between the cylinders D, E, and F, being finally discharged between the outer cylinder, F, and the side of the cage, from whence it is carried upward and escapes through the gauze in the top of the cage. I find that for locomotives it is better to dispense with the top A of the cage, and that then there is no trace left of the sparks; but for stationary engines I prefer to use this top, in which case the extinguished sparks may collect in the bottom of the cage, from whence they can be removed whenever required.

By unscrewing thumb-screws $A^4$ the whole of the outer part of the cage can be lifted off. The other parts, also, can be separated in a manner that is obvious to any person skilled in the art to which this invention refers.

I find that within practicable limits the greater the distance between the top of the funnel and the bottom of my cylinders the stronger is the draft, and that when arranged of the relative sizes and distances apart shown in my drawings the best results are attained. I also find it necessary that the diameter of my innermost cylinder should be larger than that of the top of the funnel.

Having thus described the nature of my invention and the manner of using the same, I would have it understood that I do not claim the use of cages for arresting sparks, and that, although I have shown the best method of making and putting my invention into practice, I do not confine myself to that method, nor to the sizes of the various parts, nor to the materials of which they may be made or manufactured, so long as the nature and principle of my invention be retained; but What I believe to be new, and therefore claim as my improvements, in apparatus for arresting sparks from funnels, flues, and chimneys, consists of—

1. In combination, a cage attached to the top of the flue and inclosed within the same, a series of two or more concentric cylinders, with annular interspaces supported clear above the top of the flue, and a cover closing the top of the outermost of said cylinders, substantially as and for the purpose set forth.

2. The inner cylinders, comprising the inner hood, each provided with bottom flanges extending outward and downward, and flange extending horizontally inward from the top of the middle one of said cylinders, combined with supporting-studs G, whereby said inner hood is supported above the top of the flue, and the inclosing-cage attached to the top of the flue.

3. A spark-arrester for boiler-flues, comprising an inner hood composed of concentric cylinders D E F, provided with the deflecting flanges D' E' and cover F', supported upon the studs G above the top of the flue C, and outer hood or cage, A, surrounding said inner hood, as set forth.

RICHARD MATHEW HOWLING.

Witnesses:
WALTER SMYTHE BAYSTON,
WALTER CHARLES HART.